No. 764,171. PATENTED JULY 5, 1904.
A. F. BINGENHEIMER.
ANGLING DEVICE.
APPLICATION FILED APR. 30, 1903.
NO MODEL.
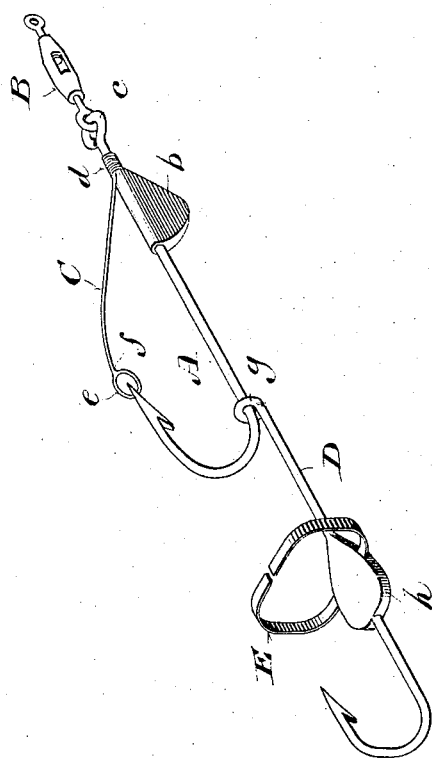
Witnesses:
Geo. W. Young
N. E. Oliphant
Inventor:
Albert F. Bingenheimer
By H. G. Underwood
Attorneys No. 764,171. Patented July 5, 1904.

UNITED STATES PATENT OFFICE.

ALBERT F. BINGENHEIMER, OF MILWAUKEE, WISCONSIN.

ANGLING DEVICE.

SPECIFICATION forming part of Letters Patent No. 764,171, dated July 5, 1904.

Application filed April 30, 1903. Serial No. 154,930. (No model.)

*To all whom it may concern:*

Be it known that I, ALBERT F. BINGENHEIMER, a citizen of the United States, and a resident of Milwaukee, in the county of Milwaukee and State of Wisconsin, have invented certain new and useful Improvements in Angling Devices; and I do hereby declare that the following is a full, clear, and exact description thereof.

My invention consists in what is hereinafter particularly set forth, with reference to the accompanying drawing, and subsequently claimed, its object being to furnish fishing-hooks having frog-holding attachments and which are preferably provided with simple, economical, and efficient means for preventing them from being caught by weeds in the water through which they are drawn.

The drawing represents a perspective view of a weedless fishing-hook provided with a frog-holding attachment, the two being in adjustable tandem connection.

Referring by letter to the drawing, A indicates a fishing-hook having its shank provided with a weight $b$ and an eye $c$ for a line-swivel B; but the weight may be omitted, and the eye is common in the art. Held on the hook-shank by a soldered wrapping of fine wire $d$ is one end of a preferably bowed piece of spring-wire C, the other end of this spring-wire being bent to form a loop $e$, that is closed at $f$ by solder. The loop end $e$ of the wire C is deflected, and its lower portion is normally under the point of the hook snug against the same, said wire serving as a fender to prevent the hook from being caught by weeds in water through which it is drawn by an angler.

While the spring wire or fender C serves to prevent the hook from being caught in weeds and also assists said hook in turning to avoid obstructions of various kinds with which it may come into contact, said wire or fender does not have resistance sufficient to interfere with the proper hooking of a fish, and it does not aid the fish in efforts to get loose after being hooked.

Loose on the shank of hook A is the eye end $g$ of a shank D of what is shown as being preferably another fishing-hook, although the lower end of the device may be a barbless bend, angular or otherwise, and held fast on the shank D at a suitable distance below the upper end of same by a mass of solder $h$ or other suitable means is a split band E, of spring-steel, flat or otherwise in cross-section, its split being outermost. It is practical and may be preferable to omit the hook below the split band E, and this band serves as a clamp to embrace a frog caught by the lips on hook A, whereby the frog is held belly side down in the water, this being its best position when used as bait, the band being spread to permit the placing of the frog within its confines.

If the shank D has a hook terminal below the split band, the frog will be positioned astraddle of said hook, said shank being herein adjustable on the one of hook A to accommodate frogs of various sizes.

The general construction and arrangement of parts herein set forth may be varied without departure from the scope of my invention, it being practical to have the frog-holding means in other than adjustable tandem connection with the fishing-hook.

Having thus described my invention, what I claim as new, and desire to secure by Letters Patent, is—

1. As an attachment to a fishing-hook, a suitable shank having a split spring-band in rigid connection therewith.

2. A fishing-hook and frog-holding mechanism in adjustable tandem connection.

3. A fishing-hook, a shank terminating at one end in an eye loose on the shank of the fishing-hook, and a split spring-band in rigid connection with the former shank.

4. A fishing-hook, another hook having the shank thereof provided with an eye that is loose on the fishing-hook shank, and a split spring-band in rigid connection with the lower hook-shank.

5. A weedless fishing-hook and a frog-holding mechanism in adjustable connection with the shank of said hook.

In testimony that I claim the foregoing I have hereunto set my hand, at Milwaukee, in the county of Milwaukee and State of Wisconsin, in the presence of two witnesses.

A. F. BINGENHEIMER.

Witnesses:
N. E. OLIPHANT,
E. W. HELLER.